United States Patent
Willmer et al.

(10) Patent No.: US 6,965,179 B2
(45) Date of Patent: Nov. 15, 2005

(54) ELECTRIC MOTOR

(75) Inventors: Martin Willmer, Friesenheim (DE); Peter Wuerfel, Villingen-Schwenningen (DE)

(73) Assignee: Minebea Co., Ltd., Miyota-machi (JP)

( * ) Notice: Subject to any disclaimer, the term of this patent is extended or adjusted under 35 U.S.C. 154(b) by 0 days.

(21) Appl. No.: 10/713,775

(22) Filed: Nov. 14, 2003

(65) Prior Publication Data
US 2004/0141286 A1 Jul. 22, 2004

(30) Foreign Application Priority Data
Nov. 16, 2002 (EP) .................................. 02025777

(51) Int. Cl.[7] .............................................. H02K 5/00
(52) U.S. Cl. .......................................... 310/89; 310/71
(58) Field of Search ..................................... 310/71, 89

(56) References Cited

U.S. PATENT DOCUMENTS

| | | | | |
|---|---|---|---|---|
| 4,104,484 A | * | 8/1978 | Ijlstra et al. | 174/151 |
| 4,181,472 A | * | 1/1980 | Sharp | 417/363 |
| 4,705,972 A | * | 11/1987 | Baines | 310/71 |
| 4,764,699 A | * | 8/1988 | Nold | 310/89 |
| 4,931,678 A | * | 6/1990 | Lutz | 310/62 |
| 5,144,183 A | * | 9/1992 | Farrenkopf | 310/268 |
| 5,326,235 A | * | 7/1994 | Bruhn | 417/410.1 |
| 5,523,634 A | | 6/1996 | Takahashi et al. | |
| 5,635,781 A | * | 6/1997 | Moritan | 310/71 |
| 5,661,357 A | | 8/1997 | Iijima | |
| 5,872,414 A | * | 2/1999 | Iijima | 310/89 |
| 6,429,555 B1 | * | 8/2002 | Stefansky et al. | 310/71 |

FOREIGN PATENT DOCUMENTS

| DE | 43 04 385 | 8/1994 |
|---|---|---|
| DE | 196 30 658 | 2/1997 |

* cited by examiner

*Primary Examiner*—Joseph Waks
(74) *Attorney, Agent, or Firm*—Lipsitz & McAllister, LLC

(57) ABSTRACT

In order, in an electric motor having a housing including a housing sleeve and a housing cover disposed at the end of the housing sleeve, a rotor mounted rotatably about a rotor axis in the housing, a stator disposed in the housing and having a least one motor winding and having an electrical connection unit disposed on the housing, to lead a feed line to the motor winding in the most favorable way possible in terms of assembly, it is proposed that at least one feed line leading from the electrical connection unit to the motor winding runs within the housing sleeve.

25 Claims, 6 Drawing Sheets

ELECTRIC MOTOR

The present disclosure relates to the subject matter disclosed in European application No. 02 025 777.0 of Nov. 16, 2002, which is incorporated herein by reference in its entirety and for all purposes.

BACKGROUND OF THE INVENTION

The invention relates to an electric motor, in particular a micro-motor, comprising a housing including a housing sleeve and a housing cover disposed at the end of the housing sleeve, comprising a rotor mounted rotatably about a rotor axis in the housing, comprising a stator disposed in the housing with a least one motor winding and with an electrical connection unit disposed on the housing.

Such electric motors are known in the prior art. The problem here is to lead a feed line to the motor winding in the most favorable way possible in terms of assembly.

SUMMARY OF THE INVENTION

This object has been achieved for an electric motor of the type described in the opening paragraph in accordance with the invention in that at least one feed line leading from the electrical connection unit to the motor runs in the housing sleeve.

A particularly simple solution is achieved in this manner and avoids the need to lead the at least one feed line to the motor winding through the housing interior which would then require special protective measures to ensure its safe passage.

When the feed line runs in the housing sleeve, it is particularly favorable if the housing sleeve is made of an insulating material since this makes extra insulating measures for the at least one feed line unnecessary.

It is particularly favorable if the housing sleeve is made of plastics.

To enable the housing sleeve to be made of plastics at low cost, it has proven favourable if the housing sleeve is made by means of injection molding.

So far, no precise details have been given concerning the form of the housing sleeve. A particularly suitable solution provides that the housing sleeve has a sleeve body and at least one rib and that the at least one feed line runs in the housing sleeve in the region of this rib. This makes it possible to use the build-up of material present in the rib to have the at least one feed line run in this without detracting from the stability of the housing sleeve.

The rib is then suitably formed in such a way that it extends on the housing sleeve in a direction approximately parallel to the rotor axis.

The feed line is located in a particularly advantageous manner in the housing sleeve when the rib stabilizes the regions of the sleeve body lying on either side of the feed line in relation to each other, in particular connects them, so that the feed line running in the housing sleeve does not weaken the housing sleeve along its course.

It is favourable if the rib is arranged in such a way that it lies on an inner side of the sleeve body.

So far, in relation to the above description of the individual embodiments, no precise details have been given concerning the arrangement of the connection unit.

The connection unit can be disposed, for example, on the housing sleeve. It is particularly advantageous if the connection unit is disposed on a first of the housing covers.

It is even more preferable for the connection unit to be mounted on the first housing cover.

Here, the connection unit is preferably formed as a connection board which carries conductor tracks so that external connections for the electric motor can be connected to the feed lines leading to the winding in a suitable way.

The electric motor is suitably formed in such a way that the stator has a first stator unit facing the housing cover and a second stator unit disposed on a side of the first stator unit lying opposite the first housing cover and that the at least one feed line running in the housing sleeve leads to the second stator unit.

The advantage of this solution can be seen in the fact that it provides a simple means of leading a feed line to the stator unit which is not connected to the first housing cover carrying the connection unit, but is located at a distance from it.

An advantageous embodiment of the electric motor according to the invention particularly provides that the first stator unit and the second stator unit are disposed on opposite sides of the rotor and the feed line thus leads from the first housing cover over the first stator unit and the rotor to the second stator unit.

So far, no precise details have been given concerning the way in which the feed lines are to run in the housing sleeve. A preferred embodiment provides that the housing sleeve has at least one groove which accommodates the feed line so that the at least one feed line running in the housing sleeve is located in this groove.

Here, it is preferable if the groove runs in the housing sleeve in a direction approximately parallel to the rotor axis.

The groove can be located on an inner side of the housing which means a side facing the stator and the rotor. In terms of assembly, it is particularly advantageous if the groove, starting at an outer surface of the housing sleeve, extends into the housing sleeve.

A particularly favourable solution provides that the groove runs in the region of the at least one rib of the housing sleeve.

The groove is preferably located such that it penetrates into the body of the housing sleeve and that the respective rib ensures that the regions of the sleeve body lying on either side of the groove remain stable and connected to each other.

To mount the feed line running in the groove in a particularly simple way, it is provided that the groove substantially penetrates through the sleeve body so that if the rib has a shorter length than the sleeve body, an opening is automatically provided to lead the feed line out from the interior of the housing.

To prevent the feed line from working free of the groove, it is preferable for the feed line to be fixed in the groove.

This can suitably be effected by fixing the feed line into the groove by means of a bonding compound.

The bonding compound is preferably formed as a sealing compound which seals the groove.

To make it even easier to lay the feed line during the assembly of the electric motor according to the invention, it is preferable for a groove in the first housing cover to adjoin a groove in the housing sleeve, so that the feed line can be led both through the first housing cover as well as the housing sleeve, in each case through a groove.

So far, no precise details have been given concerning the type of feed line which is to run in the groove. It would, for example, be conceivable to lay a conducting wire in the groove which is then connected near the stator unit to a winding wire of the motor winding, in particular a stator winding.

However, to avoid in particular an extra line connection of lines, it is especially favourable if the feed line is a winding wire which continues from the motor winding, in particular the stator winding, so that no additional connection between an extra line and the winding wire of the stator winding has to be made.

As an alternative or in addition to providing a groove through which the at least one feed line can be led, another embodiment provides that the at least one feed line is embedded in the material forming the housing sleeve. This solution has the advantage that the feed line need not be laid at a later date and thus makes it possible to lay the feed line in the housing sleeve at the same time as the housing sleeve is manufactured.

A variety of different possibilities are conceivable for embedding the feed line in the housing sleeve. An advantageous solution provides that the at least one feed line is molded into the housing sleeve.

When the housing sleeve is manufactured by means of injection molding, it is advantageous if the at least one feed line is injection molded into the housing sleeve at the same time.

If the housing sleeve is provided with a rib, it has proved particularly advantageous if the at least one feed line is embedded in the rib and thus lies in the region of a build-up of material, which prevents any weakening of the stability of the housing sleeve.

To lead the feed line to the connection unit in a favourable way, it is preferably provided that the feed line enters through an opening in the housing cover and can thus be led in a simple way to the connection unit, in particular to the connection board.

The feed line embedded in the housing sleeve could, for example, be a flexible wire. However, for ease of handling and embedding the feed line when the housing sleeve is being manufactured, it is provided that the feed line is formed as a rigid line section.

Further characteristics and advantages of the invention form the subject matter of the description below as well as the illustration in drawings of a member of embodiments.

DETAILED DESCRIPTION OF THE INVENTION

Figure 1:
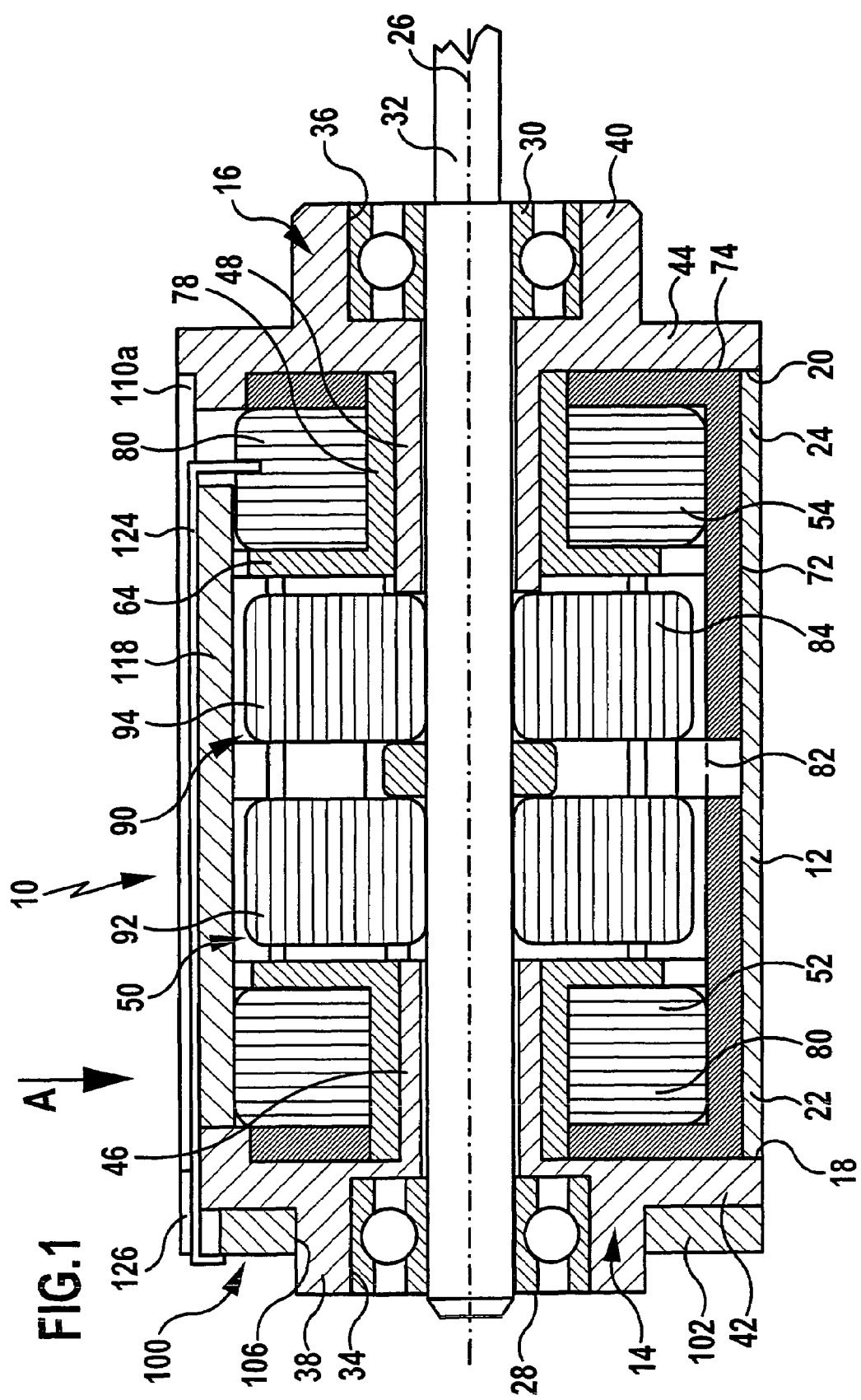
FIG. 1 a section along line 1—1 in FIG. 3 through a first embodiment of an electric motor according to the invention.

A first embodiment of a brushless electric motor according to the invention, illustrated in FIG. 1 to 4, preferably a stepper motor, includes a housing, denoted in its entirety by 10, with a housing sleeve 12, which is preferably formed as a cylindrical sleeve, and housing covers 14 and 16, which close off the housing sleeve 12 at opposite ends and which are connected to the housing sleeve 12. Each of the housing covers 14, 16 is preferably provided with recesses 18, 20 running around the housing covers 14, 16, into which recesses end regions 22, 24 of the housing sleeve engage, so that the housing covers 14, 16 are held by the housing sleeve 12 centered with respect to an axis 26.

The housing covers 14 and 16 are preferably at the same time also formed as bearing supports for rotary bearings 28, 30, in which a shaft, denoted in its entirety by 32, is rotatably mounted coaxially with the axis 26.

Here, the rotary bearings 28, 30 are inserted into bearing receptacles 34, 36 which are formed by retaining rings 38, 40 which are mounted on a supporting plate 42, 44 of the respective housing cover 14, 16 and are preferably formed integrally with the supporting plate.

The housing covers 14, 16 formed as bearing supports are moreover provided with receiving sleeves 46, 48 protruding from the supporting plates 42, 44 into the interior of the housing 10, which sleeves are used as a bearing mounting for the stator, denoted in its entirety by 50, which includes two stator units 52, 54, the stator unit 52 being held on housing cover 14 and the stator unit 54 on housing cover 16 and thus fixed in the housing 10 by this.

Figure 2:
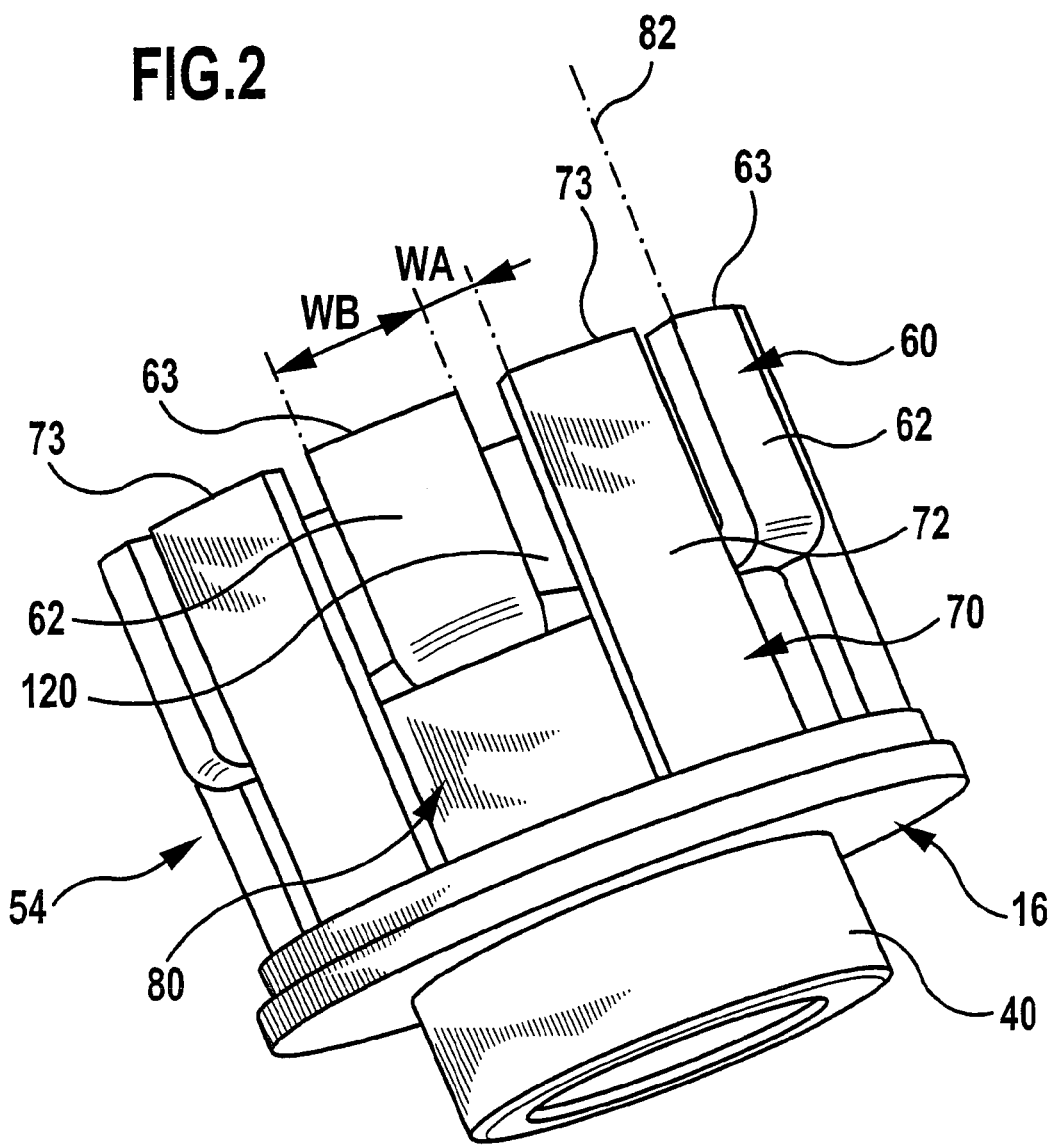
FIG. 2 an enlarged perspective view of a stator unit of the first embodiment of the electric motor according to the invention.

Each stator unit 52, 54 includes, as particularly illustrated in FIG. 2 with reference to stator unit 54, a first pole shoe element 60 which includes first pole shoes 62, formed as claw poles, as well as a pole shoe carrier 64 which preferably extends in a plane approximately perpendicular to the axis 26.

In addition, each stator unit 52, 54 includes a second pole shoe element 70 which includes second pole shoes 72, formed as claw poles, which are also held by a pole shoe carrier 74 which extends approximately perpendicular to the axis 26.

The two pole shoe carriers 64 and 74 extend approximately parallel to each other and are kept at a distance from each other by means of a connecting element 78 which is mounted on the receiving sleeve, in this case the receiving sleeve 48 of the housing cover 14, and is held by this.

The connecting element 78 creates a magnetic circuit between the first pole shoe element 60 and the second pole shoe element 70.

In addition, a toroidal coil 80, representing a stator winding, is also mounted on the connecting element 78, which coil is located between the pole shoe carriers 64 and 74 and in addition lies within the second pole shoes 62 which extend beyond the toroidal coil 80.

The first pole shoes 62 and the second pole shoes 72 preferably lie on a common, cylindrical enveloping surface 82 disposed concentrically with respect to the axis 26 and have a width in an azimuthal direction with respect to the axis 26 extending over an angular distance WB which is identical for all the pole shoes 62, 72.

Moreover, each of the second pole shoes 72 is positioned between two successive first pole shoes 62, so that the first pole shoes 62 and the second pole shoes 72 are staggered relative to each other.

This results in an angular distance WA existing between the respective successive pole shoes 62, 72 which is identical between all pole shoes 62, 72.

The first and second pole shoes 62, 72 thus overlap a space 84 enclosed by them in order to accommodate a rotor 90 which can rotate about the axis 26 representing the rotor axis.

Moreover, the stator units 52 and 54 have an identical construction and are arranged in mirror image to each other in the housing 10 so that respective ends 63, 73 of the pole shoes face each other and so that the spaces 84 substantially follow one another directly in the direction of the axis 26.

The rotor 90 is disposed in the spaces 84 of the stator units 52, 54 and includes rotor units 92, 94, rotor unit 92 being associated with stator unit 52 and rotor unit 94 being associated with stator unit 54, both rotor units 92, 94 being seated fixedly on the shaft 32 and each of the rotor units 92, 94 having magnetized regions which interact with the pole shoes 62, 72.

To supply current to the two toroidal coils 80 of the stator units 52, 54, one of the housing covers 14, 16, the first housing cover 14 in the case illustrated, is provided with an electrical connection unit 100 which preferably includes a connection board 102 which carries conductor tracks 104 and has a recess 106 which engages around the retaining ring 38 so that the connection board 102 encircles the retaining ring 38, engages against the supporting plate 42 and is preferably connected to this, for example, by bonding.

The connection of the connection board 102 to the housing cover 14 allows the toroidal coil 80 held on the housing cover 14 to be supplied with current in simple manner via the connection board 102 by lines penetrating through the housing cover 14.

For this purpose, coil connections 108*a*, *b*, for example, are provided on the connection board 102 to which, for example, a winding wire is led from the toroidal coil 80 seated on the housing cover 14.

On the other hand, supplying the coil 80 which is held on the second housing cover 16 lying opposite the first housing cover 14, is problematic to the extent that the supply has to be led on the outside around the rotor 90.

Figure 3:
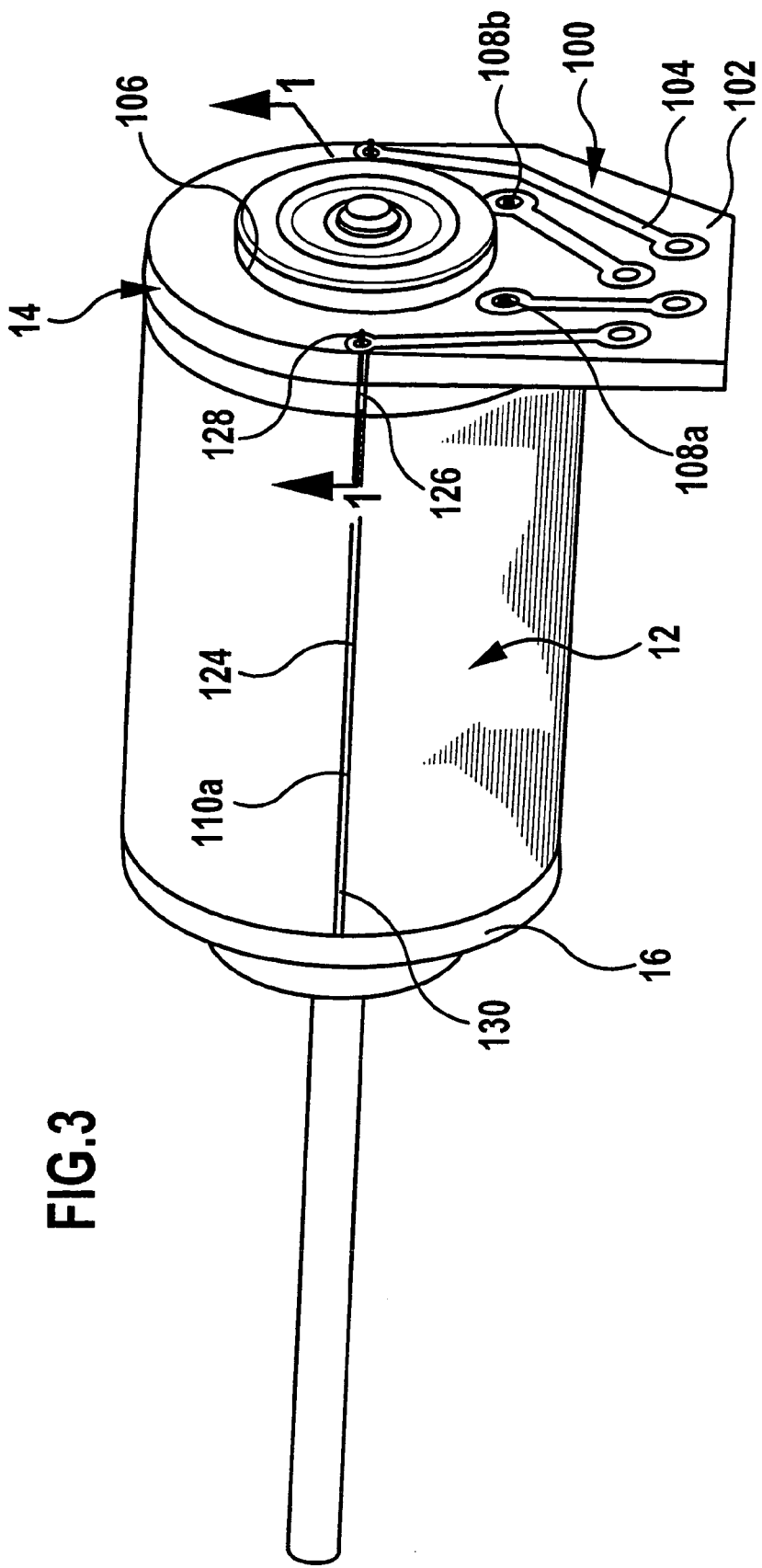
FIG. 3 a view of the first embodiment of the electric motor according to the invention in the direction of the arrow A in FIG. 1 and FIG. 4 a perspective view of a housing sleeve of the first embodiment of the electric motor according to the invention.
Figure 4:
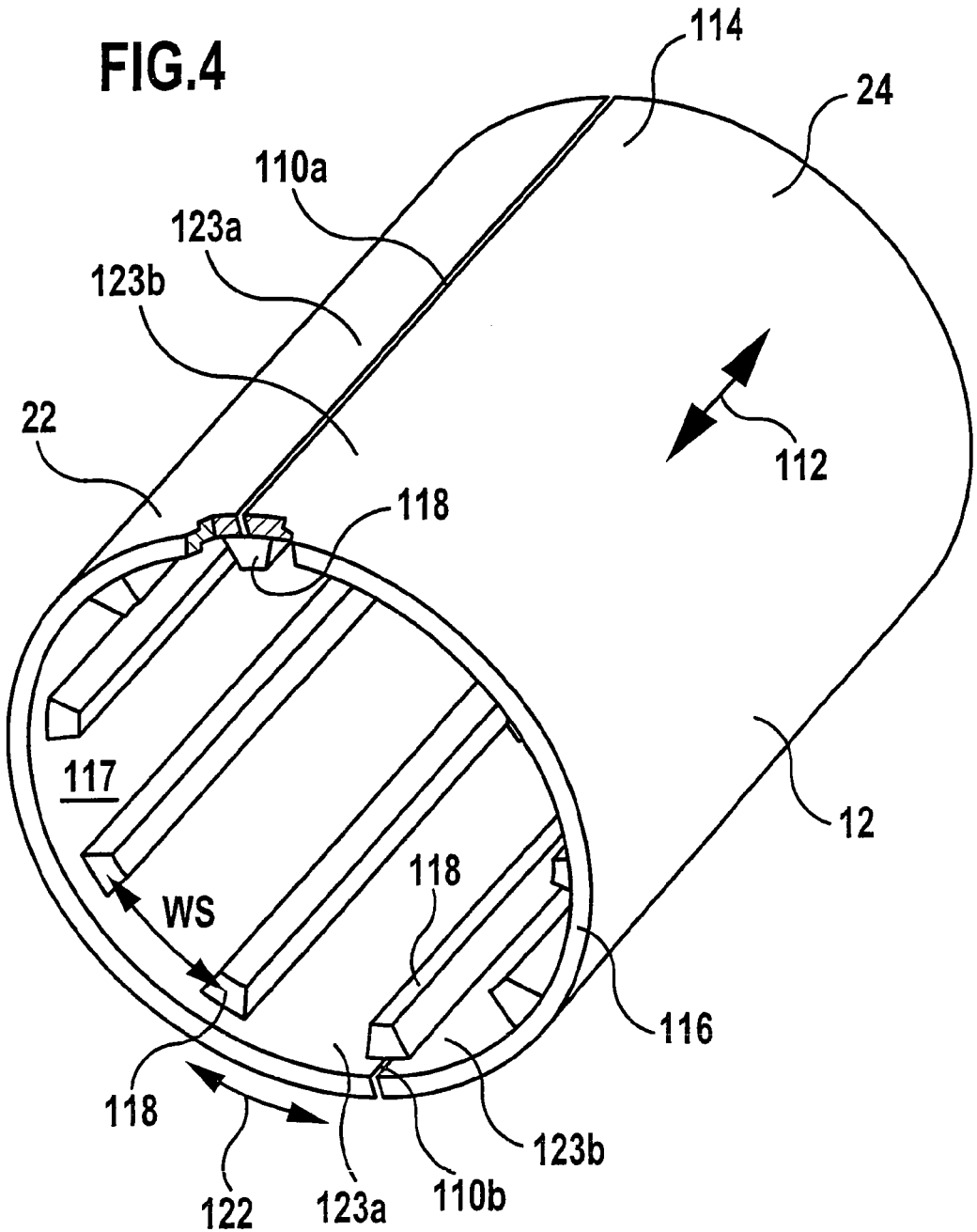

For this purpose, as illustrated in FIG. 3 and FIG. 4, the housing sleeve 12 is provided with grooves 110, for example, longitudinal grooves 110*a*, *b*, which run in a longitudinal direction 112, preferably approximately parallel to the axis 26, extending from the one end region 22 to the other end region 24 of the housing sleeve 12 and penetrate into the housing sleeve 12 from an outer surface 114.

The housing sleeve 12 is preferably made of plastics and has a sleeve body 116 which is formed, for example, by a circular-cylindrical wall extending around the axis 26 so that the grooves 110 penetrate into the sleeve body 116 from the outer surface 114.

Moreover, the housing sleeve 12 includes ribs 118 disposed on an inner side 117 of the sleeve body 116 which also run approximately parallel to the longitudinal direction 112 and, in relation to the axis 26, are disposed at a constant angular spacing WS from each other.

In the assembled electric motor, the ribs 118 lie in intermediate spaces 120 between successive pole shoes 62, 72, which spaces are produced as a result of a clearance with an angular distance WA existing between the successive pole shoes 62, 72.

As a result, the pole shoes 62, 72 of both stator units 52, 54 are by necessity arranged coaxially and aligned with each other in the housing sleeve 12 and fixed in this position by the ribs 118 on the housing 10.

At the same time, the ribs 118 are used to reinforce the housing sleeve 12 in the region of the longitudinal grooves 110*a*, *b*, in that the longitudinal grooves 110*a*, *b* have a lesser width in an azimuthal direction 122 than the ribs 118 and in addition the longitudinal grooves 110*a*, *b* run in the middle of the respective ribs 118, so that even if the longitudinal grooves 110*a*, *b* penetrate completely through the sleeve body 116 in a radial direction with respect to the axis 26, the ribs 118 would still bridge over the longitudinal grooves 110*a*, *b* and connect the regions 123*a*, *b* of the sleeve body 116 lying on either side of the longitudinal grooves 110*a*, *b* and thus ensure overall the rigidity of the housing sleeve 112.

Moreover, the longitudinal grooves 110*a*, *b* penetrate through the housing sleeve 12 at least at the end regions 22 and 24, so that, as illustrated in FIGS. 1 and 4, at the end region 24 a winding wire 124 of the toroidal coil 80 can be led out of the interior of the housing 10 via the groove 110, for example, the longitudinal groove 110*a*, and can be led within the groove 110 and within a following groove 126 in the housing cover 14 to a terminal 128 on the connection board 102, it being then possible to lay the winding wire 124 from the outside into the grooves 110 and 126 of the housing sleeve 12 and the housing cover 14.

The winding wire 124 is preferably fixed by a sealing compound 130 with which the groove 110 is filled and at the same time the groove 110 is sealed along its entire length by means of the sealing compound 130 so that the housing 10 in the region of the housing sleeve 12 is thus also sealed against media penetrating from the outside.

This solution enables the electric feed line 124 to be led in particularly simple manner from the toroidal coil 80 disposed in the stator unit 54 mounted on the second housing cover 16 to the connection unit 100, which coil is disposed at an end of the housing 10 which is located opposite the end carrying the connection unit 100.

Figure 5:
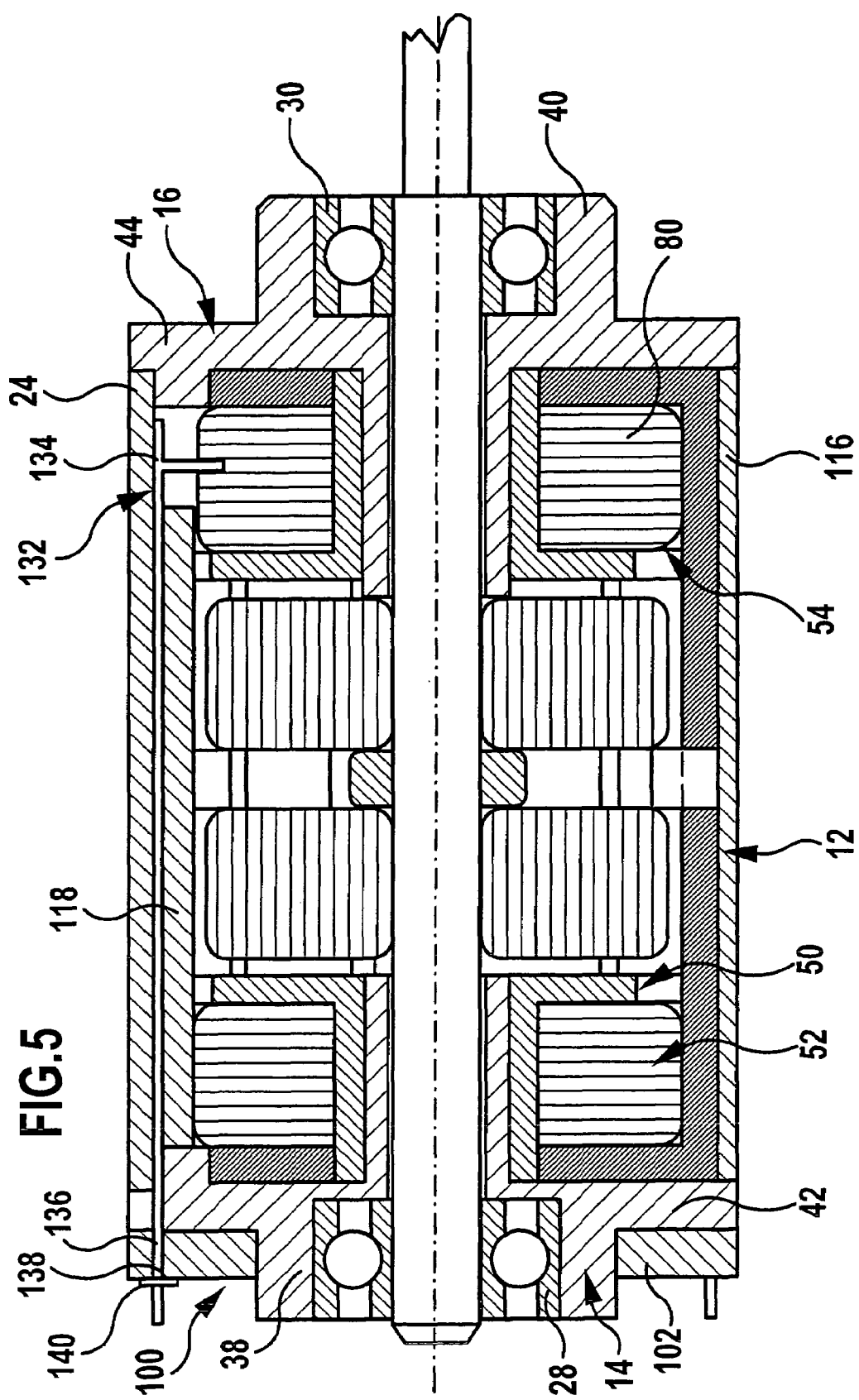
FIG. 5 a section similar to FIG. 1 through a second embodiment of the electric motor according to the invention and FIG. 6 a perspective view of a half-section through a housing sleeve of the second embodiment of the electric motor according to the invention.
Figure 6:
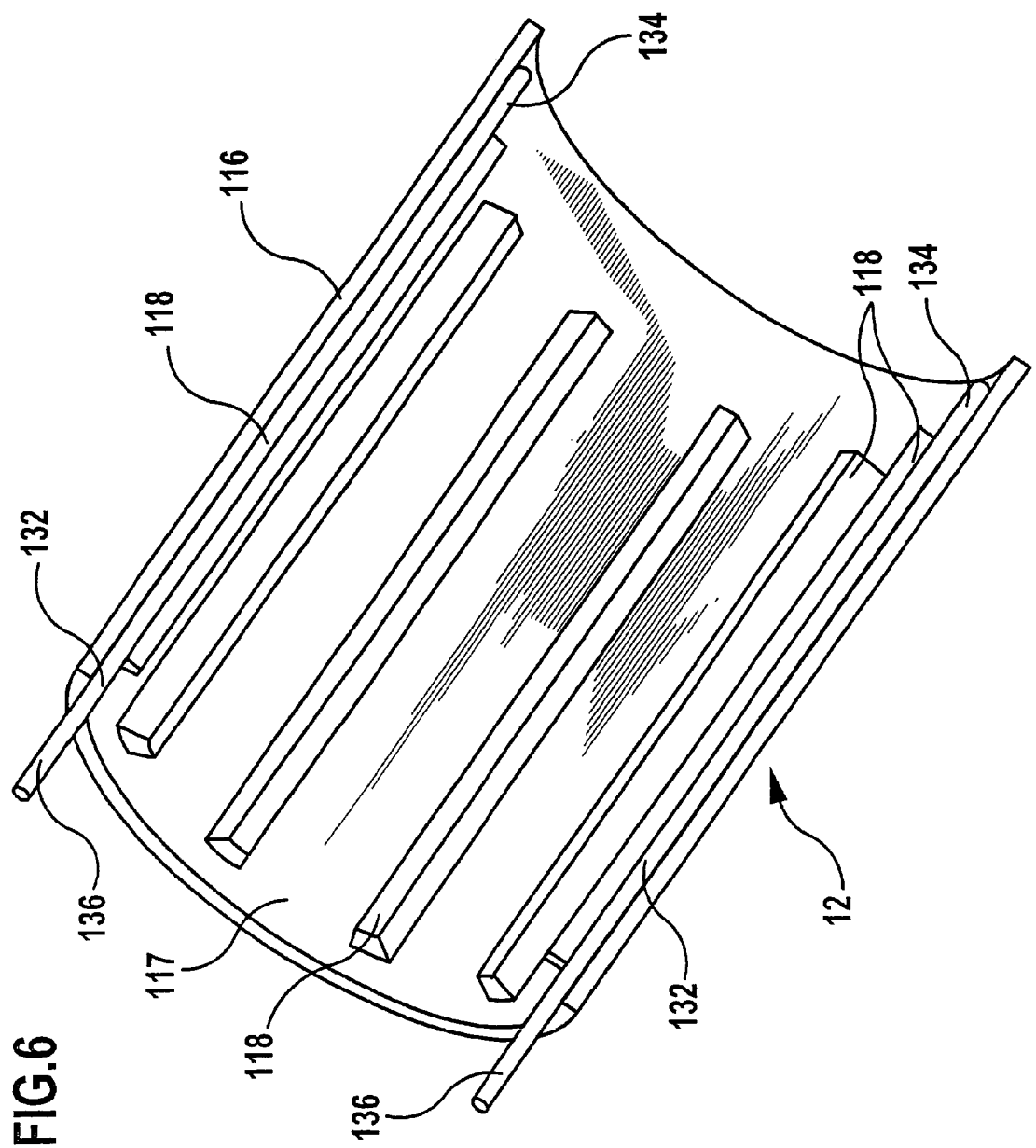

In a second embodiment of an electric motor according to the invention, illustrated in FIGS. 5 and 6, the elements which are identical with those of the first embodiment, are provided with the same references which means that where the explanation of the second embodiment is concerned, full reference can be made to the comments applying to the first embodiment.

In contrast to the first embodiment, in the second embodiment no groove is provided in the sleeve body 116 of the housing sleeve 12', but rather, feed lines 132 are embedded in the housing sleeve 12' in the region of the ribs 118 which lead from the coil 80 of the stator unit 54, which is mounted on the second housing cover 16, and thus from the end region 24 to the connection board 102, so that a connection with the appropriate conductor tracks of the connection board 102 can be made.

The feed lines 132 are then in particular embedded in the region of one of the ribs 118 and penetrate substantially through the middle of the respective rib 118, so that the feed line 132 preferably runs in the region of an inner side of the sleeve body 116.

This means that in the region of the coil 80 of the stator unit 54, it is possible to connect the winding wire of the toroidal coil 80 to the feed line 132, for example, by soldering one end 134 of the feed line 132 to a winding wire of the coil 80.

Another end 136 of the feed line 132 projects from the housing sleeve 12 at the end region 22 and can be pushed through an opening 138 in the housing cover 14 to reach a terminal 140 of the connection board 102.

A particularly advantageous embodiment of the feed line 132 provides that the feed line is formed as a rod or rib and can thus be laid in the mold when the housing sleeve 12 is injection molded and can thus be injection molded along with the housing sleeve 12.

What is claimed is:

1. An electric motor comprising:
    a housing, said housing including a housing sleeve and a housing cover disposed at the end of the housing sleeve,
    a rotor mounted rotatably about a rotor axis in the housing,
    a stator disposed in the housing with a least one motor winding,
    an electrical connection unit disposed on the housing, and
    at least one feed line leading from the electrical connection unit to the motor winding,
    the housing sleeve having a sleeve body and at least one rib, the at least one feed line running in the region of the rib within the housing sleeve, the at least one rib connecting regions of the sleeve body lying on either side of the feed line and stabilizing the regions of the sleeve body in relation to each other.

2. An electric motor according to claim 1, wherein the housing sleeve is made of an insulating material.

3. An electric motor according to claim 1, wherein the housing sleeve is made of plastics.

4. An electric motor according to claim 3, wherein the housing sleeve is made by means of injection molding.

5. An electric motor according to claim 1, wherein the at least one rib extends approximately in a direction parallel to the rotor axis.

6. An electric motor according to claim 1, wherein the at least one rib is disposed on an inner side of the sleeve body.

7. An electric motor according to claim 1, wherein;
    a first housing cover is disposed at a first end of the housing sleeve;
    a second housing cover disposed at a second end of the housing sleeve; and
    the connection unit is associated with one of the or the second housing covers.

8. An electric motor according to claim 7, wherein the connection unit is mounted on one of the first or the second housing cover.

9. An electric motor according to claim 1, wherein the connection unit includes a connection board.

10. An electric motor according to claim 1, wherein the stator has a first stator unit arranged facing the housing cover and a second stator unit disposed on a side of the first stator unit lying opposite the housing cover and that the feed line running within the housing sleeve leads to the second stator unit.

11. An electric motor according to claim 1, wherein the at least one feed line is embedded in the material forming the housing sleeve.

12. An electric motor according to claim 11, wherein the at least one feed line is molded into the housing sleeve.

13. An electric motor according to claim 11, wherein the at least one feed line is embedded in the at least one rib.

14. An electric motor according to claim 11, wherein:
    a first housing cover is disposed at a first end of the housing sleeve;
    a second housing cover disposed at a second end of the housing sleeve; and
    the feed line passes through an opening in one of the housing covers.

15. An electric motor according to claim 11, wherein the feed line is formed as a rigid line section.

16. An electric motor comprising:
    a housing, said housing including a housing sleeve and a housing cover disposed at the end of the housing sleeve,
    a rotor mounted rotatably about a rotor axis in the housing,
    a stator disposed in the housing with a least one motor winding,
    an electrical connection unit disposed on the housing, and
    at least one feed line leading from the electrical connection unit to the motor winding,
    the housing sleeve having a groove accommodating the at least one feed line, the groove starting at an outer surface of the housing sleeve and extending radially inwards into the housing sleeve.

17. An electric motor according to claim 16, wherein the groove runs in the housing sleeve in a direction approximately parallel to the rotor axis.

18. An electric motor according to claim 16, wherein the groove runs in the region of the at least one rib of the housing sleeve.

19. An electric motor according to claim 18, wherein the groove penetrates into the sleeve body of the housing sleeve and that the respective rib ensures that the regions of the sleeve body lying on either side of the groove remain stable and connected to each other.

20. An electric motor according to claim 18, wherein the groove substantially penetrates through the sleeve body.

21. An electric motor according to claim 16, wherein the feed line is fixed in the groove.

22. An electric motor according to claim 16, wherein the groove is sealed by means of a sealing compound.

23. An electric motor according to claim 16, wherein the at least one feed line is a winding wire which continues from the motor winding.

24. An electric motor comprising:
    a housing, said housing including a housing sleeve and a housing cover disposed at the end of the housing sleeve,
    a rotor mounted rotatably about a rotor axis in the housing,
    a stator disposed in the housing with a least one motor winding,
    an electrical connection unit disposed on the housing, and
    at least one feed line leading from the electrical connection unit to the motor winding,
    the housing sleeve having a groove accommodating the at least one feed line, the feed line being fixed in the groove by means of a bonding compound.

25. An electric motor comprising:
    a housing, said housing including a housing sleeve and a housing cover disposed at the end of the housing sleeve,
    a rotor mounted rotatably about a rotor axis in the housing,
    a stator disposed in the housing with a least one motor winding,
    an electrical connection unit disposed on the housing, and
    at least one feed line leading from the electrical connection unit to the motor winding,
    the housing sleeve having a groove accommodating the at least one feed line, a groove in the housing cover adjoining the groove in the housing sleeve in exact alignment therewith.

* * * * *

UNITED STATES PATENT AND TRADEMARK OFFICE
CERTIFICATE OF CORRECTION

PATENT NO. : 6,965,179 B2 Page 1 of 1
DATED : November 15, 2005
INVENTOR(S) : Willmer et al.

It is certified that error appears in the above-identified patent and that said Letters Patent is hereby corrected as shown below:

Column 7,
Line 35, insert -- first -- before "or the".

Signed and Sealed this

Thirty-first Day of January, 2006

JON W. DUDAS
*Director of the United States Patent and Trademark Office*